United States Patent
Canis et al.

(10) Patent No.: US 11,636,112 B2
(45) Date of Patent: Apr. 25, 2023

(54) UPDATING CACHE DATA

(71) Applicant: AMADEUS S.A.S., Sophia-Antipolis (FR)

(72) Inventors: Laure Canis, Nice (FR); Sarah Muguerza, Antibes (FR); Victor Alonso, Antibes (FR); Celine Pradin, Villeneuve Loubet (FR); Antoine Menard, Mougin (FR); Jean-Baptiste Rey, Antibes (FR); Geoffrey Claude, Nice (FR)

(73) Assignee: AMADEUS S.A.S., Biot (FR)

( * ) Notice: Subject to any disclaimer, the term of this patent is extended or adjusted under 35 U.S.C. 154(b) by 999 days.

(21) Appl. No.: 15/944,572

(22) Filed: Apr. 3, 2018

(65) Prior Publication Data

US 2019/0303449 A1    Oct. 3, 2019

(51) Int. Cl.
*G06F 17/30* (2006.01)
*G06F 15/18* (2006.01)
*G06F 12/0893* (2016.01)
*G06F 16/2455* (2019.01)
*G06N 20/00* (2019.01)
*G06F 16/23* (2019.01)

(52) U.S. Cl.
CPC .... *G06F 16/24552* (2019.01); *G06F 12/0893* (2013.01); *G06F 16/23* (2019.01); *G06F 16/24556* (2019.01); *G06N 20/00* (2019.01)

(58) Field of Classification Search
CPC ......... G06F 17/30457; G06F 17/30477; G06F 17/30067; G06F 17/30312; G06F 2216/13; H04L 67/2842; H04L 67/10
See application file for complete search history.

(56) References Cited

U.S. PATENT DOCUMENTS

| | | | |
|---|---|---|---|
| 5,668,987 A * | 9/1997 | Schneider | G06F 12/0802 |
| 6,341,281 B1 * | 1/2002 | MacNicol | G06F 16/24539 |
| 2004/0249682 A1 | 12/2004 | DeMarcken et al. | |
| 2009/0234682 A1 | 9/2009 | Baggett et al. | |

(Continued)

FOREIGN PATENT DOCUMENTS

| | | |
|---|---|---|
| EP | 2908255 A1 | 8/2015 |
| EP | 3128441 A1 | 2/2017 |
| WO | WO-2015124274 A1 | 8/2015 |

OTHER PUBLICATIONS

EPO, Extended European Search Report, dated Jul. 9, 2019, re European Patent Application No. 19166525.6.

*Primary Examiner* — Hosain T Alam
*Assistant Examiner* — Chongsuh Park
(74) *Attorney, Agent, or Firm* — Perry + Currier

(57) ABSTRACT

Cached data is updated by a computing machine coupled to a primary database maintaining original data and to a cache maintaining data corresponding to the data in the primary database. In response to receiving a first database query relating to a first data, the computing machine determines whether to process the first database query by utilizing the cache or based on the primary database. In response to concluding processing the first database query, the computing machine determines whether to update the first data in the cache, and based on the result of the determining, updates the first data in the cache based on original first data in the primary database.

19 Claims, 10 Drawing Sheets

(56) References Cited

U.S. PATENT DOCUMENTS

| | | | |
|---|---|---|---|
| 2013/0080388 A1* | 3/2013 | Dwyer | G06F 16/24552 707/634 |
| 2014/0310232 A1* | 10/2014 | Plattner | G06F 16/24539 707/602 |
| 2016/0171008 A1 | 6/2016 | Ciabrini et al. | |
| 2017/0017688 A1* | 1/2017 | Das | G06F 16/2453 |

* cited by examiner

UPDATING CACHE DATA

TECHNICAL FIELD

The present subject-matter generally relates to database technology. More specifically, it is directed to updating cached data after a processing a query on the cached data or original data is concluded.

BACKGROUND

A common problem in database technology is to ensure short response times to database queries or requests which require complex, long and resource-intensive processing, e.g. due to large volumes of data. For example, such computing-power consuming processing has to be performed in response to so-called "open queries" which contain only little input information (e.g. only one or two parameters out of a dozen possible parameters are specified and/or the specified value ranges of the parameters are broad) and, consequently, lead to a large number of results in general. Possibilities to speed up data processing by increasing hardware performance are limited. Thus, attention is drawn to improving the mechanisms underlying the complex, long and resource-intensive processing in order to respond to such queries.

One general approach to shorten response times is to prepare results to be returned in response to expected requests (e.g. by pre-computing or pre-collecting such results based on original data) and to maintain the corresponding query results in a pool of pre-computed query results. Requests are then not processed and responded to on the basis of the original data basis, but are directed to the pool of pre-computed query results.

Re-computing a large number of pre-computed query results is a task consuming a substantial amount of computation resources. Thus, re-computation mechanisms are sought to efficiently perform the re-computation of pre-computed query results.

EP 2908255 A1 describes a network node (referred to as switch) that utilizes a confidence factor which indicates a probability of the associated search result being valid to control whether to respond to a search query based on pre-collected search results or a primary database.

SUMMARY

According to a first aspect, a method executed by a computing machine is provided to update data in a cache. The computing machine is coupled to a primary database maintaining original data and to the cache maintaining data corresponding to the data in the primary database. In response to receiving a first database query relating to a first data, the computing machine determines whether to process the first database query by utilizing the cache or based on the primary database. In response to concluding processing the first database query, the computing machine determines whether to update the first data in the cache, and based on the result of the determining, updates the first data in the cache based on original first data in the primary database.

According to a second aspect, a corresponding computing machine is provided which is arranged to execute the method.

According to a third aspect, a computer program stored on a storage medium is provided which, when executed by a computation machine, provides the computation machine with the corresponding functionality.

Further optional aspects are set forth by the detailed description.

BRIEF DESCRIPTION OF THE FIGURES

The present mechanisms will be described with reference to accompanying figures. Similar reference numbers generally indicate identical or functionally similar elements.

DETAILED DESCRIPTION

In order to handle database queries or batch computation requests which require computations on the basis of large volumes of underlying data, data subject to expected database queries can be cached (pre-collected, pre-computed) and stored as cached data in a cache or cache database, while the original data is kept in a primary database. The cache is queried by requesting entities (such as clients, applications, browsers installed on user terminals, etc.) in the course of a search and any cached data fulfilling search criteria indicated by the query are returned to the client in response to the query. Subsequently, the term "database query" is used herein as a general term including any type of information retrieval requests such as transactional queries, requests for batch computations and other forms.

The approach of caching data and storing the cached data in the cache accessible to querying clients leads to the general situation that the cached data get may become outdated or invalid (both terms are used synonymously herein) over time due to changes of the original data from which the cached data are derived. Cached data which are still up-to-date, i.e. which match the corresponding original data equivalents, are called "valid" cached data hereinafter.

Generally, to enable a search platform (i.e. a platform arranged to receive database queries and return responses to the database queries) to return correct results, one wants to maintain a significant degree of correlation between cached data which are provided to the querying entity in response to database queries and their original data equivalents. At the same time, however, it is desirable to minimize computation resource consumption caused by re-computations or cache updates, i.e. to avoid any unnecessary re-computations such as re-computation/updates of still valid cached data. Computing resources are limited and, generally, there are not enough computing resources to re-compute/update all cached data at all times. Thus, a trade-off between cached data validity and utilization of the available computing resources is sought.

In order to render re-computation/cache updates more efficient, metrics are defined to evaluate how "necessary" or "unnecessary" a re-computation is. For instance, it is inefficient in terms of computation or update resources to conduct an entire massive pre-computation periodically (e.g. every day) if less than half of the cached data turns out to be outdated. On the other hand, if particular classes of original data are known to change frequently, updating corresponding cached data several times per day might be beneficial for the validity of the cache. Consequently, an effective way of assessing or estimating cached data validity is sought, generally taking into account both the associated gain on validity and the technical resource costs of re-computation/cache updates.

Figure 1:
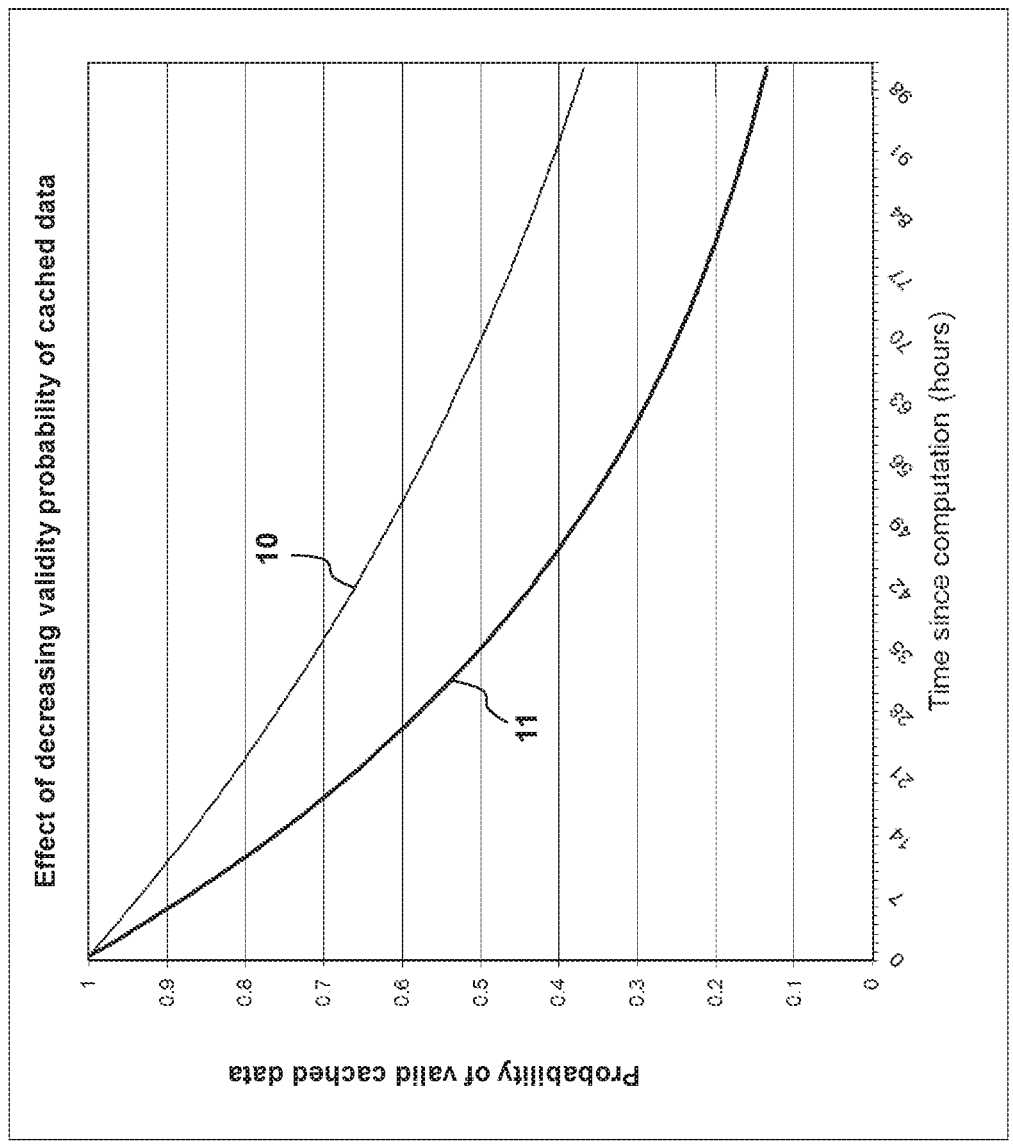
FIG. 1 visualizes an effect of decreasing validity probability of pre-computed query results over time.

To this end, some mechanisms model the decreasing validity of cached data over time. Two exemplary functions of this probable accuracy decreasing over time are depicted by FIG. 1. Function 10 represents a cached data which potentially remains more accurate (or, more correctly, stays at a higher probability of being valid over time) than another cached data associated with function 11. For example, the cached data represented by function 10 has 70% probability of being still valid at 35 hours after its last update, while the other cached data characterized by function 11 is only valid up to about 50% at 35 hours after its latest re-computation. Functions 10 and 11 may also represent whole shares of plural cached data and then indicate proportions of the shares of cached data likely being valid at a time passed since the last update of the share.

Figure 2:
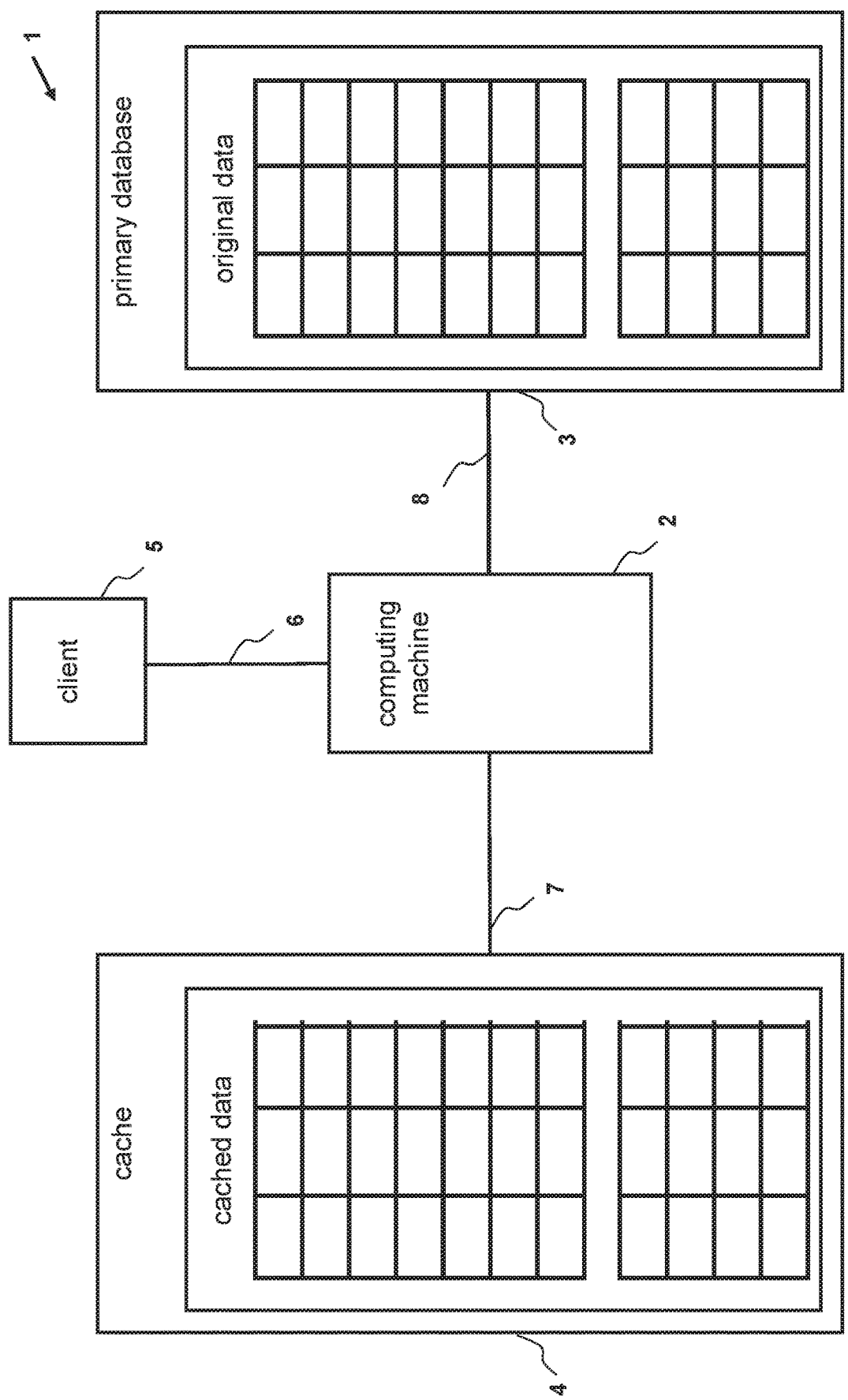
FIG. 2 schematically depicts an example of a distributed database system.

FIG. 2 illustrates a distributed database system 1 as utilized herein in a schematic manner. Original data is kept in a primary database 3. The term "original data" refers to data that is generally valid and forms the basis for all data processing within the database system 1, in particular the data to which database queries are directed. The original data may concern any type of information in a particular domain. For example, the original data may be located in the domain of computer-based electronic circuit simulations (such as circuit simulations subject of decision T 1227/05 by the EPO Boards of Appeal) and contain information on input values for the computer-based electronic circuit simulations, parameters of a model used by the computer-based electronic circuit simulations, intermediate and/or final simulation results, and the like.

Cached data corresponding to the original data is stored in a cache 4. Cached data may be identical to the corresponding original data (as e.g. in the example of web crawlers crawling and caching Internet website contents) and/or pre-computed or pre-processed based on the original data (e.g. by additionally indexing the data in the cache 4) in order to decrease response times to answer database queries as compared to times required to retrieve the corresponding original data from the primary database 3. In this regard, the term "cached" also covers any sort of transforming the original data into the cached data stored in the cache 4 by any sort of computation and processing. For example, in the domain of computer-based electronic circuit simulations, pre-computation may involve performing simulations with a reduced set of parameters (compared to with all parameters of the real-world system), but with varying values of said set of parameters in order to obtain results to be used as input values in the further simulations with additional or other sets of parameters.

The cache 4 is a database which is significantly faster than the primary database 3, e.g. due to pre-computation of data, its central network location, broadband network connection, special hardware adapted to fast data retrieval and/or database protocols and indexes increasing data retrieval performance. The term "database" here encompasses any number and types of structured information storage system such as standard stand-alone databases such as Standard Query Language (SQL) or Non-SQL databases as well as complex, distributed and/or proprietary databases, relational databases or object-oriented databases. The original data and the cached data may be stored in the primary database 3 and the cache 4, respectively, using any type of structured information such as records, arrays, parts of database tables (e.g., columns, lines, or entries), or the like.

Clients 5 such as applications on user terminals access the data from the system 1 by way of database queries over interface 6. The database query receiving and processing entity of the system 1 is herein denoted as computing machine 2. The computing machine 2 is communicatively coupled to the cache 4 by a further interface 7 and to the primary database 3 by still another interface 8. The functional entities of the system 1, i.e. computing machine 2, primary database 3 and cache 4 may be constituted of one or several hardware machines depending on performance requirements. For example, the computing machine 2 may be composed of a plurality of co-located and/or dis-located hardware machines constituting several points of contacts. A plurality of primary databases 3 and/or caches 4 may be utilized to mirror the same data, for example, for reasons of redundancy. Each of the interfaces 6, 7, 8 utilizes a Local Area Network (LAN), a Metropolitan Area Network (MAN), and/or a Wide Area Network (WAN) such as the Internet and is implemented by any suitable communication and network protocol(s).

Figure 3:
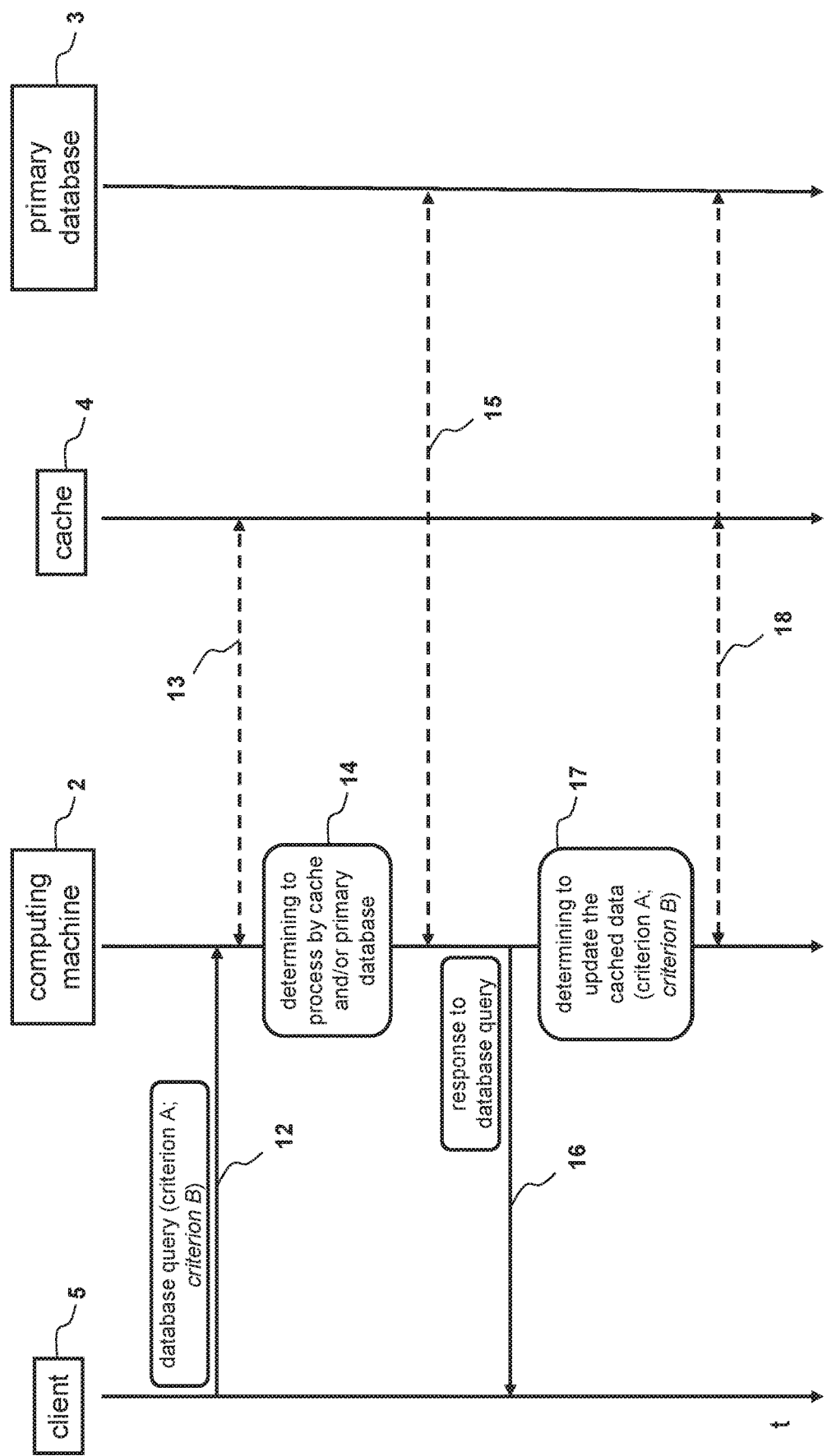
FIG. 3 is a high-level message sequence chart to update cached data.

With reference to FIG. 3, in order to improve efficient processing and computing resources to update cached data maintained in the cache 4, the following mechanism employed at the computing machine 2 is provided herein.

A first database query 12 is transmitted by a client 5 and received by the computing machine 2. The term "database query" includes all types of database requests including e.g. read requests to retrieve data and write requests to insert, change or delete data.

The first database query 12 relates to a first data maintained by the system 1, either in the cache 4 and/or in the primary database 3. As a non-limiting example only, query 12 shown by FIG. 3 includes one or more query criteria such a first criterion A and optionally further criteria B. These query criteria specify the data to which the first database query 12 refers to, in the example of FIG. 3 all data fulfilling the query criteria, e.g. the first criterion A and optionally the further criteria B. The first data may thus be composed of one or multiple data records, arrays, database table lines, etc. The same also applies to other database queries such as the more specific examples of FIGS. 4 and 5 as well as to the second data related to the first data as e.g. described below with reference to FIG. 6.

In response to receiving the first database query 12, the computing machine 2 determines 14, based on at least one given polling factor, whether to process the first database query 12 by utilizing the cache 4 or based on the primary database 3. Responding to the database queries by involving the primary database 3 is also referred to as "polling". In some examples, the at least one polling factor includes an indication of the likelihood of whether or not the cached data is valid.

To this end, the cached data maintained in the cache 4 are e.g. associated with respective validity metrics which may be similar to the confidence factors as described by EP 2 908 255 A1. For example, each cached data or each share of a plurality of cached data stored by the cache 4 has a corresponding validity metric. Each validity metric indicates a probability that the associated cached data or share of cached data is still valid, i.e. a probability that the cached data coincides with its corresponding original data from which the cached data has been derived. In some examples, the validity metrics are given by an age $t_i$ of a cached data i (or share of a plurality of cached data) referring to the time passed since the last update or re-computation this cached data and a validity rate $\lambda_i$ of the cached data i being a measure of how long the cached data i may remain valid or how fast the cached data i becomes invalid due to changes of the underlying original data. In some examples, the validity metric acc of a cached data i is given by $acc_i = e^{-\lambda_i t_i}$.

In some examples, the validity metrics of the cached data are stored in the cache 4. Hence, determination 14 may thus include an optional (as indicated by the dotted arrow) retrieval 13 of the cached data to which the first database query 12 relates and the associated validity metric and computing machine 2 evaluates the validity metrics from the cache 4. To this end, the computing machine 2 searches the cached data to which the first database query 12 relates (e.g. which fulfil criterion A) in the cache 4 and retrieves these cached data from the cache 4. In more detail, in operation 13, the computing machine 2 may send a retrieval request to the cache 4. The retrieval request 13 includes at least part of the one or more of the criteria of the first database query 12. The cache 4 executes the search in the cache 4 based on the retrieval request 13, i.e. identifies the cached data among all the data in the cache 3 matching the criteria of the first database query 12 and returns the identified cached data including the associated validity metrics to the computing machine 2. Hence, the returned cached data has values or parameters which coincide (i.e. match) the criteria of the first database query 12.

Determining 14 may then include comparing the validity metrics of the retrieved cached data with a given threshold. The computing machine 2 determines the probability of the cached data being valid, e.g. by computing $acc_i = e^{-\lambda_i t_i}$ for each retrieved cached data i. Insofar as the validity metrics are above the given threshold, the computing machine 2 determines to process the database query 12 by utilizing the cache 4 and, accordingly, returns these cached data by the response 16. Otherwise, for cached data with validity metrics not above the given threshold, the computing machine 2 determines to process the database query based on the primary database 3 and, accordingly optionally retrieves 15 corresponding original data from the primary database 3. To this end, the computing machine 2 sends a respective retrieval request to the primary database 3. The primary database 3 executes the retrieval request by identifying original data that fulfils the criteria in the first database query 12 and returns the identified original data to the computing machine 2. In response to receiving the original data from the primary database 3, the computing machine 2 returns 16 the retrieved original data to the client 5. This concludes processing the first database query 12.

In some embodiments, the computing machine 2 employs one or more other or further polling factors in addition to or instead of the validity metric (validity rate indicating a probability for first data in the cache 4 being valid at a certain age) described above. For example, the decision whether or not to poll the primary database 3 in operation 12 is based on a type of the first database query request (read or write, preferably polling for write requests), an existence of the first data in the cache (if the cache 4 does not maintain the first data, the primary database 3 is polled), a polling error rate being a ratio between a number of access failures to the primary database and a number of access attempts to the primary database, a number of write accesses on the original first data in a given timeframe, an age of the first data in the cache (i.e. the likelihood of validity of the first data in the cache is based on the age without any differentiation of a validity rate $\lambda_i$), an access frequency of the first data in the cache (a historic number database queries relating to the first data over time), and/or an update resource being a measure of computation costs and/or network load required to update the first data in the cache (e.g. refrain from polling if update resources are limited). The computing machine 2 may employ any combination of any number of these polling factors Further, the computing machine 2, in response to concluding processing the first database query, determines 17 whether to update the first data in the cache 4, also briefly referred to as the first cached data herein. It has been recognized that a correlation may exist between a plurality of database queries. The first database query 12 may therefore be an indicator that the same data may be requested from the database system 1 also by subsequent database queries. Hence, the first database query 12 is treated as a trigger to possibly update the data in the cache 4 to which the first database query 12 related, i.e. the first data.

This is generally different from other cache update management procedures known in the art, such as the cache update according to EP 2911070 A1 and EP 3016000 A1 which relate to model-based background updates independent from individual queries to the system. This is also generally different from known polling mechanisms such as EP 2 908 255 A1 and EP 3128441 A1 which decide at query processing time whether to respond to a query by cached data or by original data retrieved from an original data source.

A technical effect of the mechanism proposed compared with these known procedures is that an initial database query relating to first data can be quickly responded based on cached data without delaying the response by retrieving original data from the slower primary database 3 (compared to the cache 4), while the first cached data is updated after the conclusion of the database query processing in order to increase the validity of the first cached data for subsequent database queries again relating to the first data. For example the validity metric threshold for the initial database query may be set to a lower value as compared by the confidence factor values of EP 2 908 255 A1 and EP 3128441 A1, so that the initial database query is responded based on the cache 4 also if the validity probability of the first cached data is lower, but updating the first cached data after terminating the query processing increases the validity probability of the first cached data for subsequent database queries again relating to the first data. As explained in more detail below, the term "initial" may refer to a database query which relates to particular data the first time after a certain period of time has passed.

In this way, validity of the cached data is increased in an efficient manner in terms of response times and computing resources and database queries can be responded to in a faster manner, compared to the references mentioned above.

Based on the result of the determining 17, the computing machine 2 updates the first data in the cache 4 based on original first data in the primary database 3. If the determining 17 indicates to update the first data, the first data in the cache 4 is optionally updated 18 by e.g. retrieving the corresponding original data from the primary database 3 and/or re-computing the first cached data based on the corresponding original data kept in the primary database 3. If the determining 17 does not indicate any need to update the first cached data, the procedure ends without any update 18.

Determining 17 to update the first cached data may include checking one or more properties or characteristics of or relating to the first cached data in order to deduplicate multiple update requests and, thus, avoid too many update requests concerning the first cached data. In some embodiments, the first cached data is updated if no previous second database request relating to the first data was received and processed within a given time period, also referred to as update time period. Such database queries are considered to be "initial" queries of a series of related queries as already mentioned above.

Observing the update timer period is e.g. implemented by using an update inhibit timer for each first cached data. The update inhibit timer of the first cached data is started each time the first cached data is updated and further updates of the first cached data are allowed after the update inhibit timer expires. Hence, in these embodiments, the first cached data is (immediately) updated if determining operation 17 yields that no update inhibit timer is running for the first cached data.

On the other hand, in these embodiments, updating the first data in the cache is inhibited in response to determining that at least one previous second database query relating to the first data was received within the given update time period, i.e. the database query was not an initial query. Inhibiting refers to not updating the first data in the cache at the current point of time, but to rather to delaying updating the first cached data until the update inhibit timer expires or, alternatively, discarding updating the first cached data.

Figure 9:
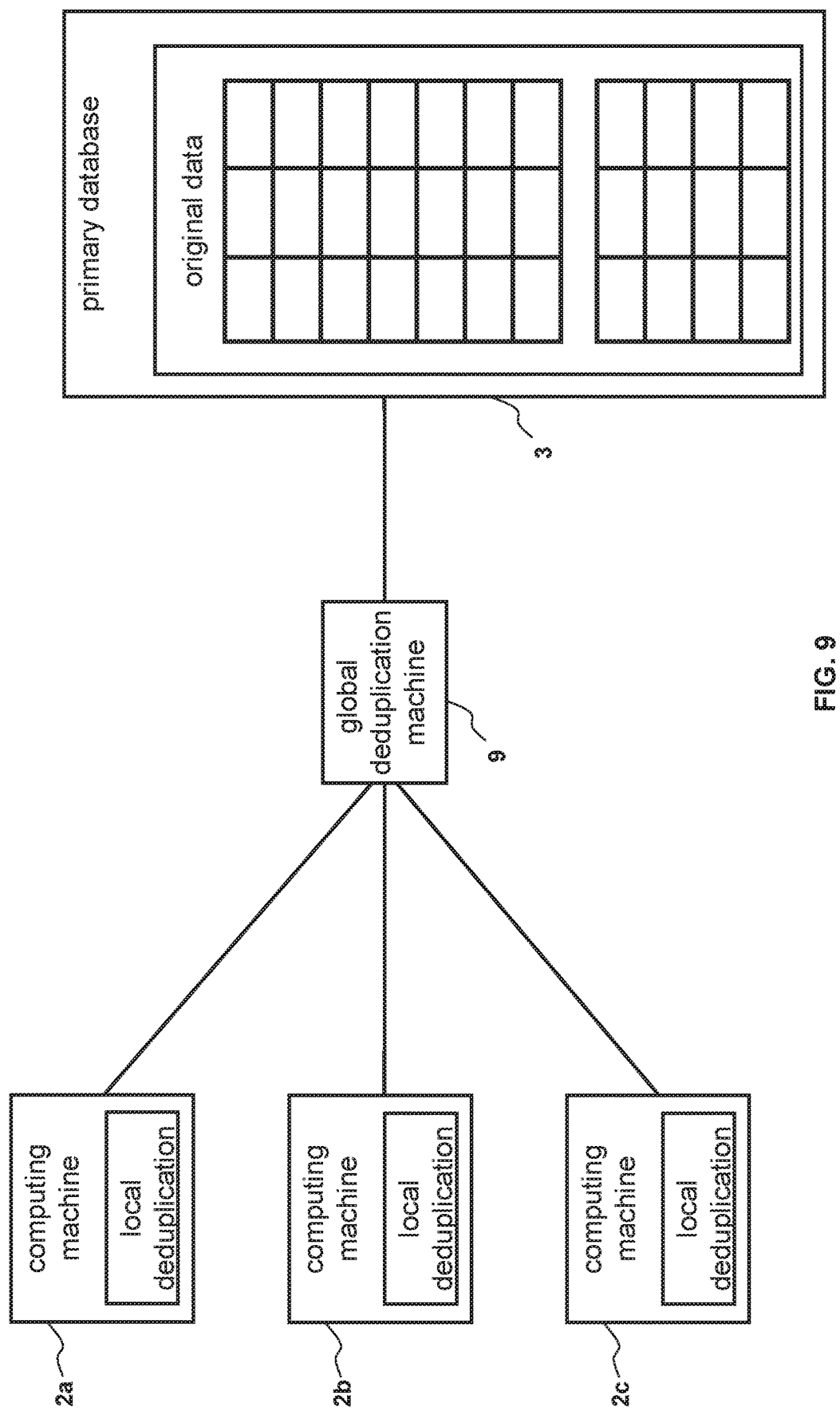
FIG. 9 shows an arrangement to deduplicate cache update requests.

Additionally or alternatively, in some embodiments, the update time period starts with any event (beyond database queries) relating to the data concerned, e.g. including a determination that a data is likely invalid and/or a cache update of the data for any other reason such as a regular, planned or periodic cache update. In all cases, the specific value of the given update time period is set depending on the implementation of the system. Inhibiting updates for following database queries and events in a series of database queries and events can also be considered as a local deduplication of database queries and events relating to the same data in the computing machine 2 in order to limit the number of cache updates, as also visualized and referred to by FIG. 9 further below.

Figure 4:
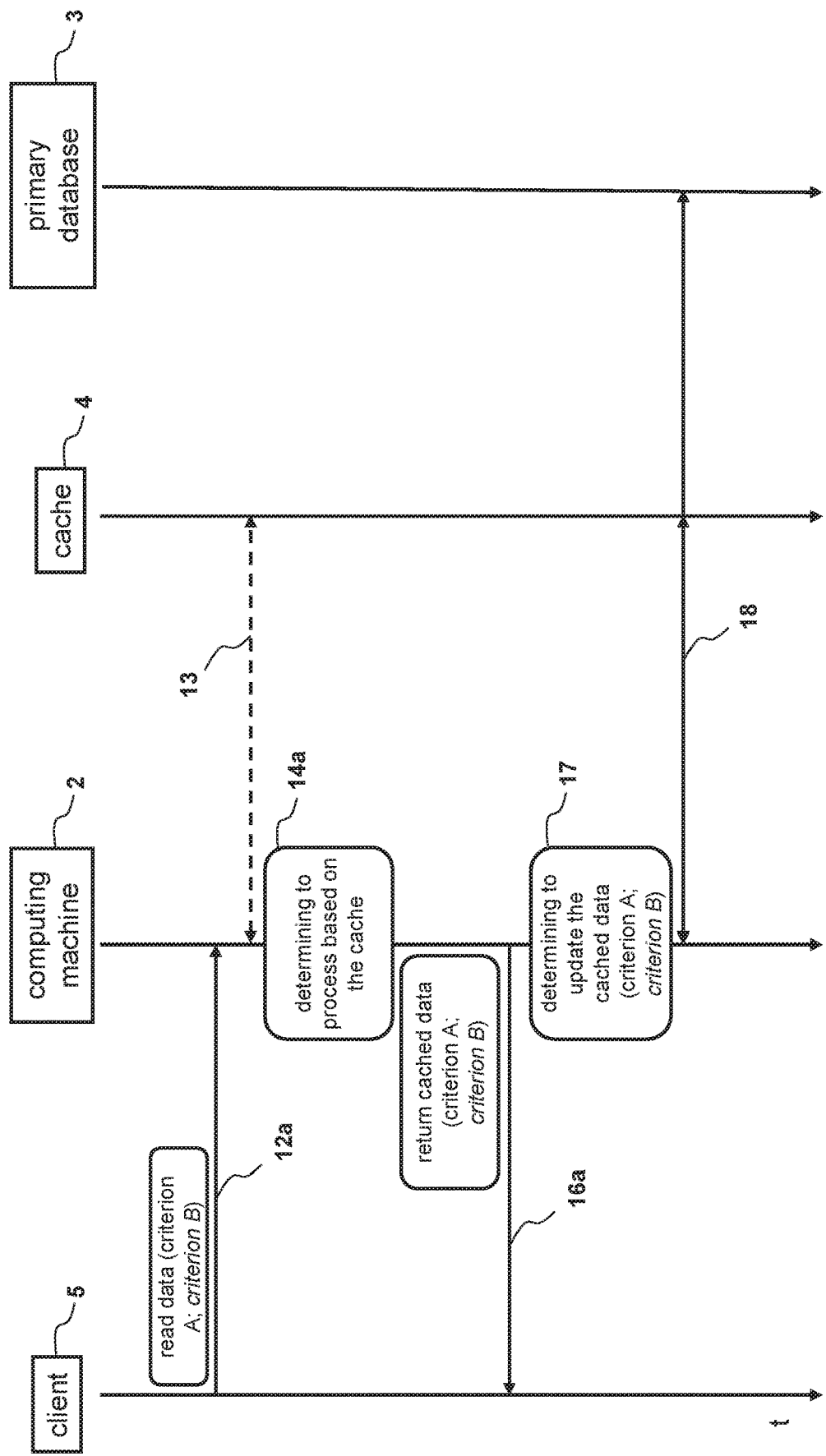
FIG. 4 shows a high-level message sequence for a read query.
Figure 5:
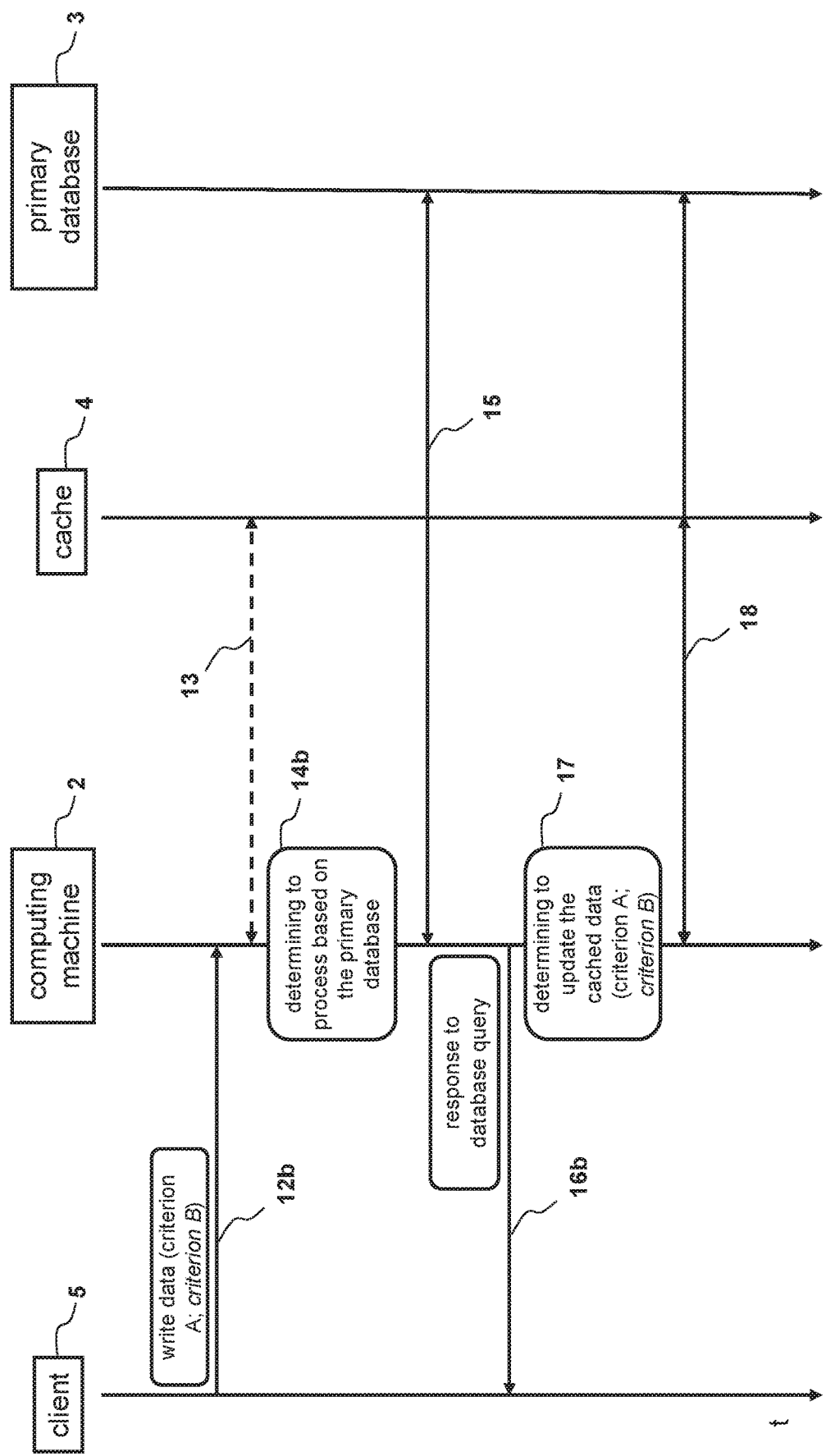
FIG. 5 shows a high-level message sequence for a write query.

FIGS. 4 and 5 are further examples of the mechanism of FIG. 3, wherein the first database query 12 is further specified as a read request (FIG. 4) and a write request (FIG. 5), respectively.

As mentioned above, the first database query 12 may be a read query 12a constituting a read request to retrieve the first data (FIG. 4). Depending on the one or more polling factors, in response to receiving the first database query 12, the computation machine 2 determines 14a e.g. to process the first database query 12, 12a utilizing the cache. In some embodiments, the determining 14a includes determining that the validity metrics of the first cached data (retrieved from the cache 4 by operation 13) is above the given validity metric threshold (which may be reduced compared to known polling mechanisms such as EP 2 908 255 A1 and EP 3128441 A1). The computing machine 2 then returns 16a the first cached data to the client 5.

In these situations, determining 17 to update the first data in the cache is accordingly performed in response to concluding processing the first database query utilizing the cache. The first data in the cache is updated 18 e.g. in response to determining that there was no previous second database query relating to the first data within the given update time period, as already explained above.

Determining 14 may also indicate that the read query 12a is to be processed based on the primary database 3, e.g. by determining that the validity metrics of the first cached data (retrieved from the cache 4 by operation 13) is not above the given validity metric threshold. In these situations, as explained above with reference to FIG. 3, corresponding original first data is retrieved 15 from the primary database 3 and returned 16 to the client 5. In these situations, determining operation 17 will likely indicate that the first cached data is to be updated (as its validity metrics have been determined to be low in operation 14) and update operation 18 may directly utilize the original first data as retrieved from the primary database 3 in operation 15 (FIG. 3), without any further access to the primary database 3.

In other occasions, the first database query 12 may be a write query 12b constituting a request to change, replace, insert or delete the first data (FIG. 5). In some embodiments, the write query type indicates to the computing machine 2 that the query is to be processed based on the primary database 3 for reasons of data consistency. Hence, cache retrieval operation 13 can be skipped and the computing machine 2 determines 14b based on the write type of the first database query 12 that the query is to be processed based on the primary database 3. Accordingly, the computing machine 2 processes 15 the first database query 12b based on the original first data in the primary database 3 which results in a change of the original first data in the primary database 3. The computing machine 2 responds 16b to the client 5 e.g. by acknowledging that the write query 12b has been successfully executed and/or the changed value of the first data as now present in the primary database 3.

In these situations, determining 17 to update the first data in the cache based on the changed original first data in the primary database 3 is performed in response to concluding processing the first database query 12 based on the original first data in the primary database 3, i.e. after the response 16b to the first database query has been sent to the client 5. As outlined above, the computing machine 2 e.g. determines in operation 17 whether a previous second database query 12 relating to the first data was received in a given update time period. If this is not the case, the first data in the cache 4 is updated 18. Updating 18 may directly utilize the changed value of the original first data which may be already known to the computing machine 2 due to operation 15, so that a further communication with the primary database 3 may not occur in operation 18.

In some embodiments, determining operation 17 may also take into account the write type of the database query 12b which has likely outdated the first cached data in the cache 4. In these embodiments, determining operation 17 determines that the database query 12b was a write query and therefore e.g. forces an update of the first data in the cache 4 irrespective of whether or not a previous second database query 12 relating to the first data was received within the given update time period.

In some embodiments, in response to concluding processing the first database query 12, the computing machine 2 additionally determines 19 whether to update at least one second data in the cache 4 which is correlated to the first data. As already mentioned above, it has been recognized that a correlation may exist between a plurality of database queries. The first database query 12 relating to the first data may therefore not only be an indicator that the same first data may be requested from the database system 1 also by subsequent database queries, but may also be an indicator that subsequent database queries may request other data than the first data which is correlated to the first data. Hence, in these embodiments, the first database query 12 is treated as a trigger to possibly update the second data in the cache which is correlated to the first data that was subject of the first database query 12.

Figure 6:
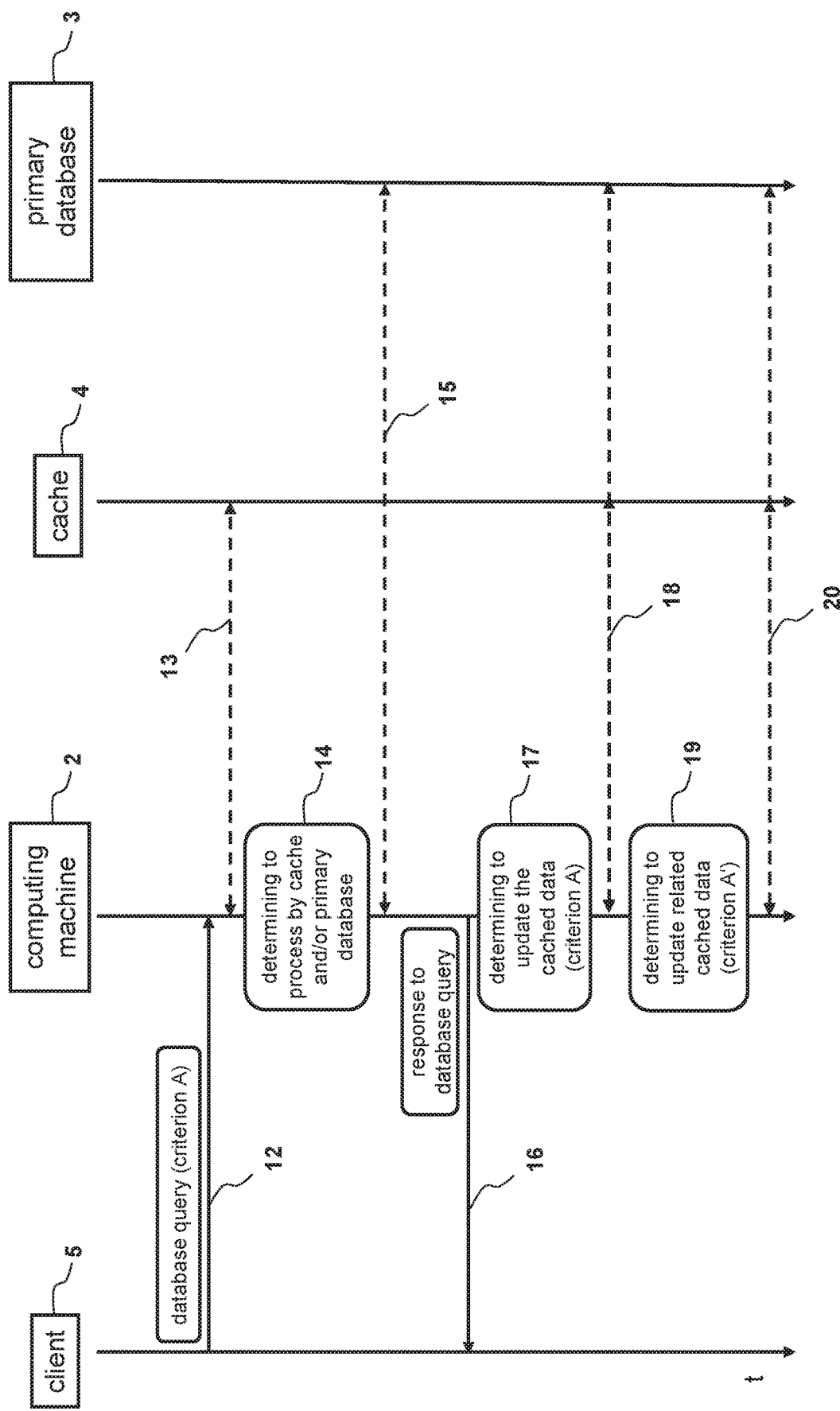
FIG. 6 is a high-level message sequence chart to update related cached data.

An update 20 of the second data in the cache 4 is based on original second data in the primary database 3 corresponding to the second data in the cache 4. In the example of FIG. 6, the first database query 12 concerned first data defined by criterion A. Determining operation 17 thus determines whether or not to update 18 the first cached data defined by criterion A. In addition, determining operation 19 determines whether related cached data defined by criterion A' is also to be updated 20.

The correlation between the first data and the second data e.g. relates to identical or similar validity metrics. For example, the first data and the second data may have close functions 10, 11 as shown by FIG. 1. The first data and the second data may also be correlated in other ways, e.g. by having related parameters. For example, the first data may constitute simulation results from a simulation run number X, while the second data may constitute the simulation results from the next simulation run number X+1. Correlation between data may exist on the level of individual data and shares of plural data. Further, various degrees of correlation may exist, and the first data and the second data may be considered to be correlated herein if the degree of correlation meets a given threshold.

Principles of correlation between data are generally known, e.g. from EP 3016000 A1, paragraphs [0029] to [0032] and [0057] of which specifically relating to correlation are incorporated by reference herein.

Determining operation 19 may employ the same logic as determining operation 17, i.e. e.g. include a determination whether or not a previous database query relating to the second data was received by the computing machine 2 within the given update time period. Determining operation 19 may also take into account additional factors such as available update resources (network capacity on interface 8, computation/retrieval resources at the primary database 3). Hence, although an update of the second cached data may be indicated by the basic factors, lacking update resources may yield a result of determining operation 19 to inhibit an update of the second cached data.

Furthermore, determining operation 19 may be independent from the result of determining operation 17. Hence, even if e.g. determining operation 17 indicated that the first cached data is not to be updated (e.g. because a previous second request relating to the first data was received within the given update time period), determining operation 19 may indicate that the second cached data is to be updated. In other implementations, determining operation 19 may be dependent from determination operation 17 in the sense that the result of determining operation 17 is also transferred to determining operation 19, i.e. a decision to update the first cached data is also a decision to update the second cached data. In these embodiments, determining operations 17 and 19 may form a combined operation (i.e. a combined box 17, 19 in FIG. 6).

It is noted that the computing machine 2 does not necessarily determine 17 whether or not to update the first data in the cache 4 and optionally determine 19 whether or not to update the second data in the cache immediately after processing the first database query 12 is concluded. As explained above, having processed the first database request 12 is a trigger to possibly update the first data and the second data in the cache and a certain amount of time may pass between conclusion of processing the first database query 12 and determining operations 17 and 19. For example, in some embodiments, the computing machine 2 keeps a log and adds an entry of the first database query 12 to the log. Other database queries are also added to the log after they have been processed. The computing machine 2 may then e.g. periodically process the logged database queries and perform determining operations 17 and optionally 19 for all logged database queries.

Figure 7:
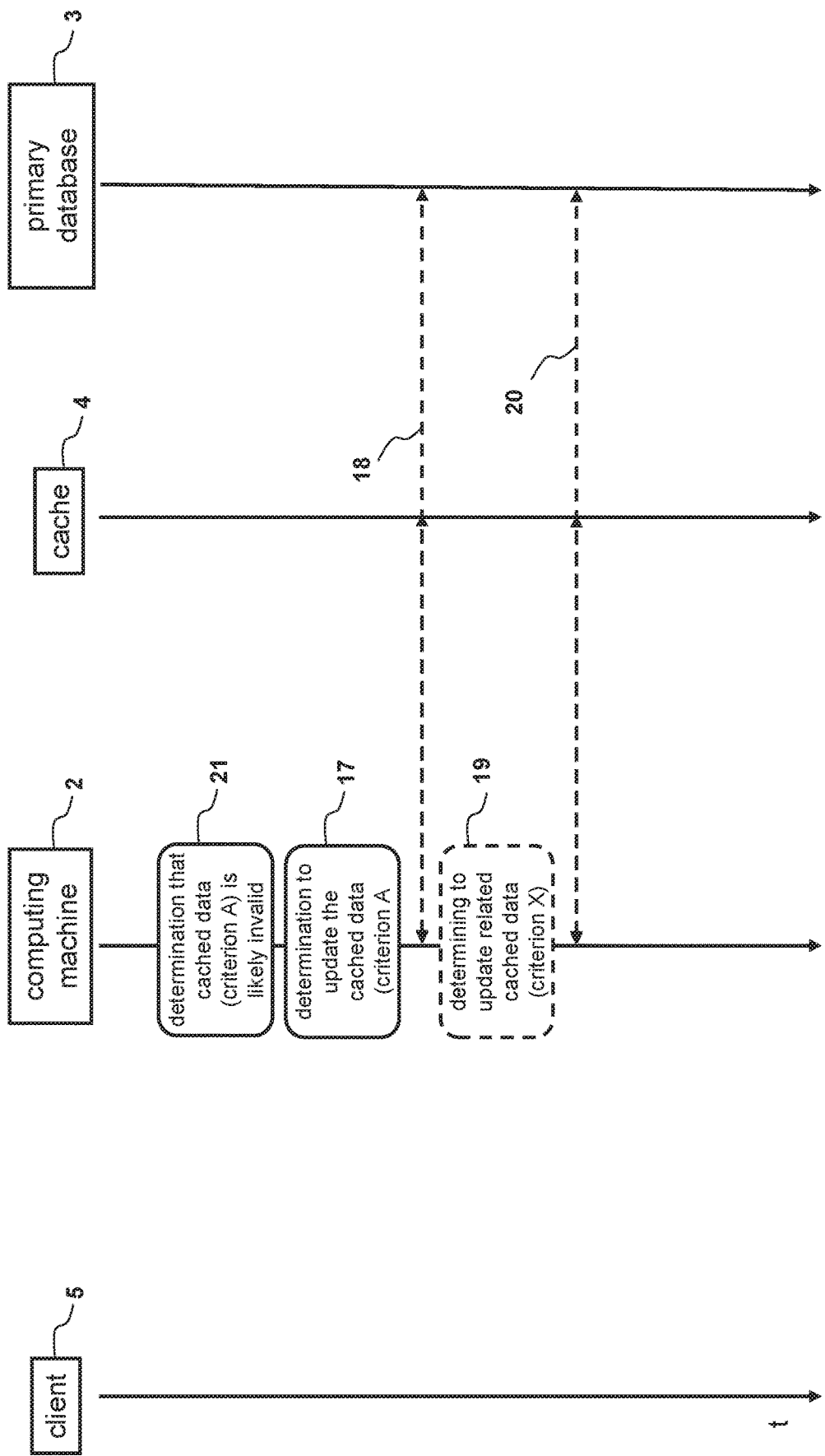
FIG. 7 relates an additional example of an update of cached data.

Some embodiments include further triggers for determining whether to update the first cached data, beyond incoming and processed database queries. For example, in these embodiments, the computing machine 2 (or any other entity communicatively coupled to the computation machine 2 and forming a logical part of the computing machine 2) determines 21, by employing a machine-learning algorithm, a decrease of a likelihood that the first data in the cache 4 is still valid, i.e. that the first cached data is still identical with or corresponds to the original first data in the primary database 3 (FIG. 7). For example, determining operation 21 may determine that the validity metric of the first data (e.g. function 10 of FIG. 1) has fallen below a given validity threshold.

In response to determining operation 21 indicating a decrease of a likelihood that the first data in the cache 4 is still valid, the computing machine 2 determines 17, based at least on the decrease of the likelihood that the first data in the cache 4 is still valid, to update the first data in the cache 4 based on the original first data in the primary database 3. Determining operation 17 of FIG. 7 is similar to determining operation 17 in FIGS. 3 to 6, i.e. may be based on the same logic such as verifying whether or not a previous database query relating to the first data was received within the given update time period, but additionally takes into account the validity metric of the first data.

Likewise as in FIG. 6, the computing machine 2 may further determine 19 whether to also update second cached data correlated to the first cached data.

Figure 8:
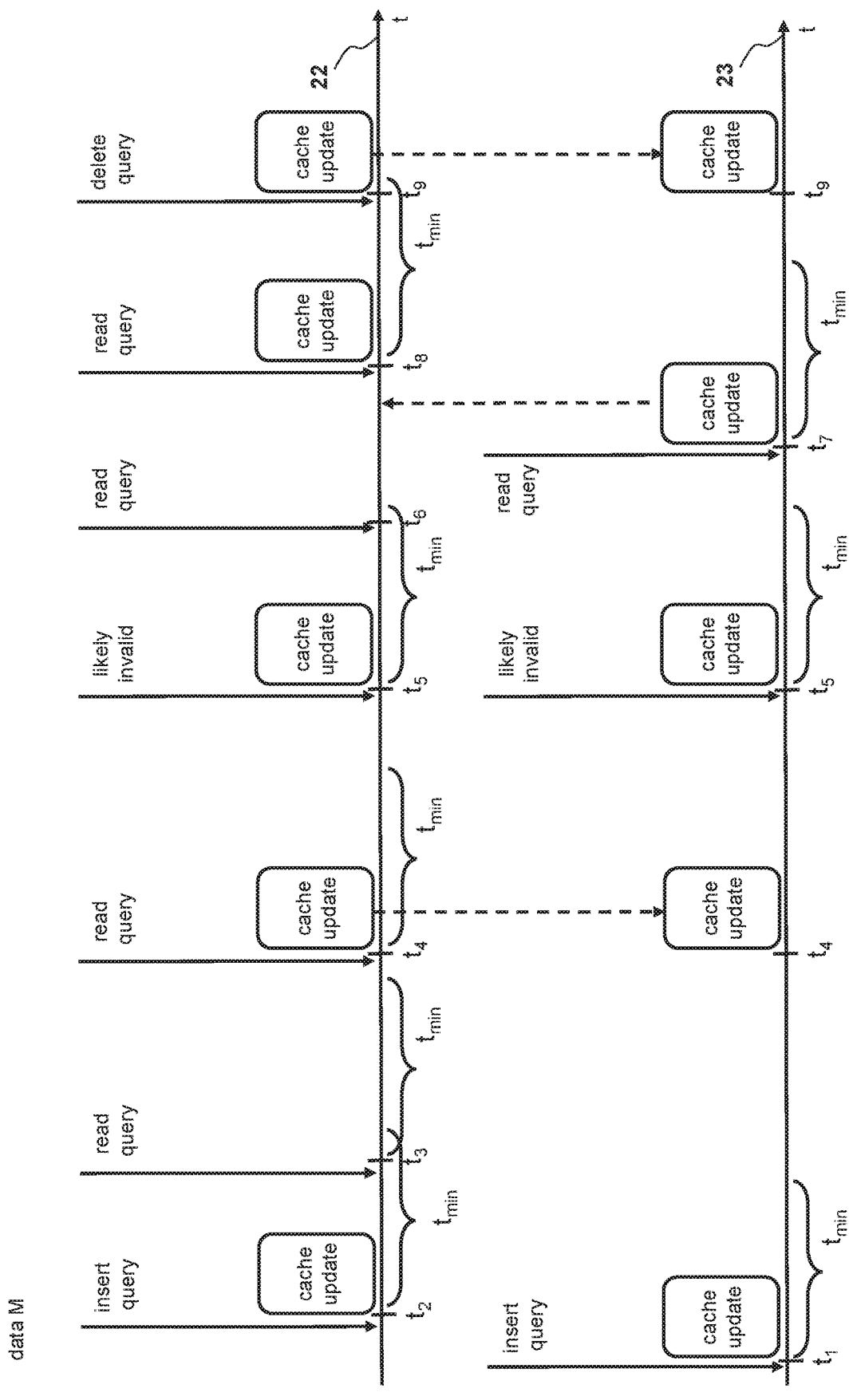
FIG. 8 visualizes exemplary series of updates of cached data over time.

FIG. 8 visualizes an example of multiple iterations of the functionalities described above with reference to FIGS. 3 to 7 over time. The upper timeline 22 shows database queries and events relating to first data referred to as "data M", while the lower timeline 23 shows database queries and events relating to second data referred to as "data N" which is related to the data M. As mentioned above, the first data M and the second data N, respectively, may be one or more data records, arrays etc. which are subject to a database request or which form any further share of interrelated data within the primary database 3 such as a database table.

At a first point of time $t_1$, data N is inserted into the primary database 3 by an insert query. Determining operation 17 determines that data N is to be updated 18 in the cache 4 as no previous database query within the given update time period (referred to as "$t_{min}$" in FIG. 8 which is e.g. observed by a respective update inhibit timer as explained above) has been logged and the insert query is a write query. At a second point of time $t_2$, data M is added to the primary database 3. Likewise, determining operation 17 determines that data M is to be updated 18 in the cache 4 as no previous database query within the given update time period has been logged (e.g. the update inhibit timer for data M is not running) and the insert query is a write query. The update inhibit timer for data M is started.

At a third point of time $t_3$, a read query is received by the computing machine 2 which relates to data M. Determining operation 14 determines to process the read query based on the cache 4. After having returned 16 data M to the requesting client 5, the computing machine 2 determines 17 to inhibit a cache update as $t_3$ is still within the given update time period $t_{min}$ initialized by $t_2$ (the update inhibit timer for data M is still running) and, thus, the insert query is considered to be a previous database query received within the given update time period. As mentioned above, inhibiting in order to deduplicate multiple updates occurring within a certain time period refers to not updating at the current point of time, and to either discarding or delaying the cache update of the data concerning. FIG. 8 visualizes the discarding variant. In the delaying variants, any inhibited update is in fact performed at the end of a $t_{min}$ time period, i.e. in response to an expiry of the update inhibit timer.

With continuing reference to FIG. 8, after a certain amount of time has passed, another read query relating to data M is received by the computing machine 2 at point of time $t_4$. This time, the computing machine 2 again determines 14 to process the read query based on the cache 4 and returns 16 data M to the requesting client 5. However, the given update time period re-initialized at $t_3$ has passed and, thus, determining operation 17 determines to perform a cache update 18 as no previous database query relating to data M was received within the given update time period. In accordance with FIG. 6, a cache update 20 is also determined 19 for related data N as e.g. no previous database query relating to data N has been received within the given update time period.

After further time has passed, a likely invalidity of data M and data N is recognized and both, data M and data N, are updated 18 at point of time $t_5$. In the example of FIG. 8, this cache update re-initializes the respective given update time period for both, data M and data N. Another read query relating to data M is received at point of time $t_6$ which is still within the given update time period for data M and, thus, no cache update is determined 17 after processing this read query is concluded.

At point of time $t_7$, a read query is received requesting data N. Since the previous event (the likely invalidity determined at $t_5$) occurred earlier than the given update time period, a cache update 18 for data N is determined 17 at $t_7$. For reasons of completeness, the computing machine 2 may also perform a determination operation 19 for data M (visualized by the dotted arrow from N to M at point of time $t_7$) as data M is related to data N and, from the perspective of data N, constitutes second data in the sense used above. In the example of FIG. 8, it is assumed that no cache update is performed for data M at $t_7$ e.g. due to insufficient update resources at $t_7$. As a consequence, at point of time $t_8$, another cache update of cached data M is performed after the read query at $t_8$ is processed because determination operation 17 determines that no previous database query or other event occurred within the given update time period for data M.

Finally, at point of time $t_9$, a delete query is received to delete data M from the primary database 3. The computing machine 2 determines 14 to process the delete query utilizing the primary database 3 for reasons of data consistency. After concluding processing the delete query, the computing machine 2 determines 17 to perform a cache update 18 for data M. Although a previous database request was received during the given update time period (namely the read query at $t_8$), the cache update at $t_9$ is forced due to the write type of the delete query. A cache update 20 is also determined 19 for data N as no previous database query for data N was received during the given update time period.

In some embodiments, further deduplication mechanisms are employed in order to further limit the updates 18, 20 and corresponding requests to the primary database 3 and relieve interface 9 and primary database 3 from load. In these embodiments (FIG. 9), the system 1 is a more complex distributed database system with a plurality of local nodes 2a, 2b, 2c (i.e. computing machines 2) arranged to receive database requests from client machines 5. The computing machine 2 is one of these plural local nodes in the distributed database system 1 with the plurality of local nodes and at least one central node, referred to as a global deduplication machine 9 in FIG. 9. The distributed database system 1 may also include a plurality of caches 4. For example, each of the plurality of local nodes may be equipped with a local cache 4.

In the embodiments employing further deduplication, the computing machine 2 monitors a history of database requests relating to any first data in order to perform local deduplication as already mentioned above. In response to determining that no previous second database query relating to the first data in the cache 4 was received within the given update time period, the computing machine 2 (e.g. local node 2a) sends a first update request to update at least the first data in the cache 4 to the central node 9 in order to effect an update of the first cached data. Respective update requests concerning any first data and second data are also sent by other computing machines 2b, 2c to the central node 9.

The global deduplication machine 9 processes all incoming update requests from the computing machines 2a, 2b, 2c. In response to receiving the update request concerning the first data from one of the local nodes 2a, the global deduplication machine 9 performs cache update deduplication at the global level. To this end, in response to determining that at least one previous second update request to update the first data in the cache 4 was received from another local node 2b, 2c within a further given time period, also referred to as central update time period, the central node 9 inhibits updating the first data in the cache 4. Hence, the global deduplication machine 9 filters the update request concerning the first data and relieves the primary database 3 from corresponding load. Rather, the global deduplication machine returns a reject message to the requesting computing machine 2a which indicates that the update request is rejected. The central update time period is set to an appropriate value according to the implementation of the system 1, e.g. equal to or greater than the (local) update time period(s) employed by the computing machines 2 as deduplication utilizing the (local) update time period(s) is already performed at the local level of the computing machines 2. The central node 9 may employ a similar update inhibit timer per cached data as already described for the computing machine 2 in detail above.

In some embodiments, instead of filtering multiple update requests, the central node 9 delays forwarding update requests until the central update inhibit timer expires. The central node 9 may inform the requesting computing machine 2 that the update request will be processed with delay.

Figure 10:
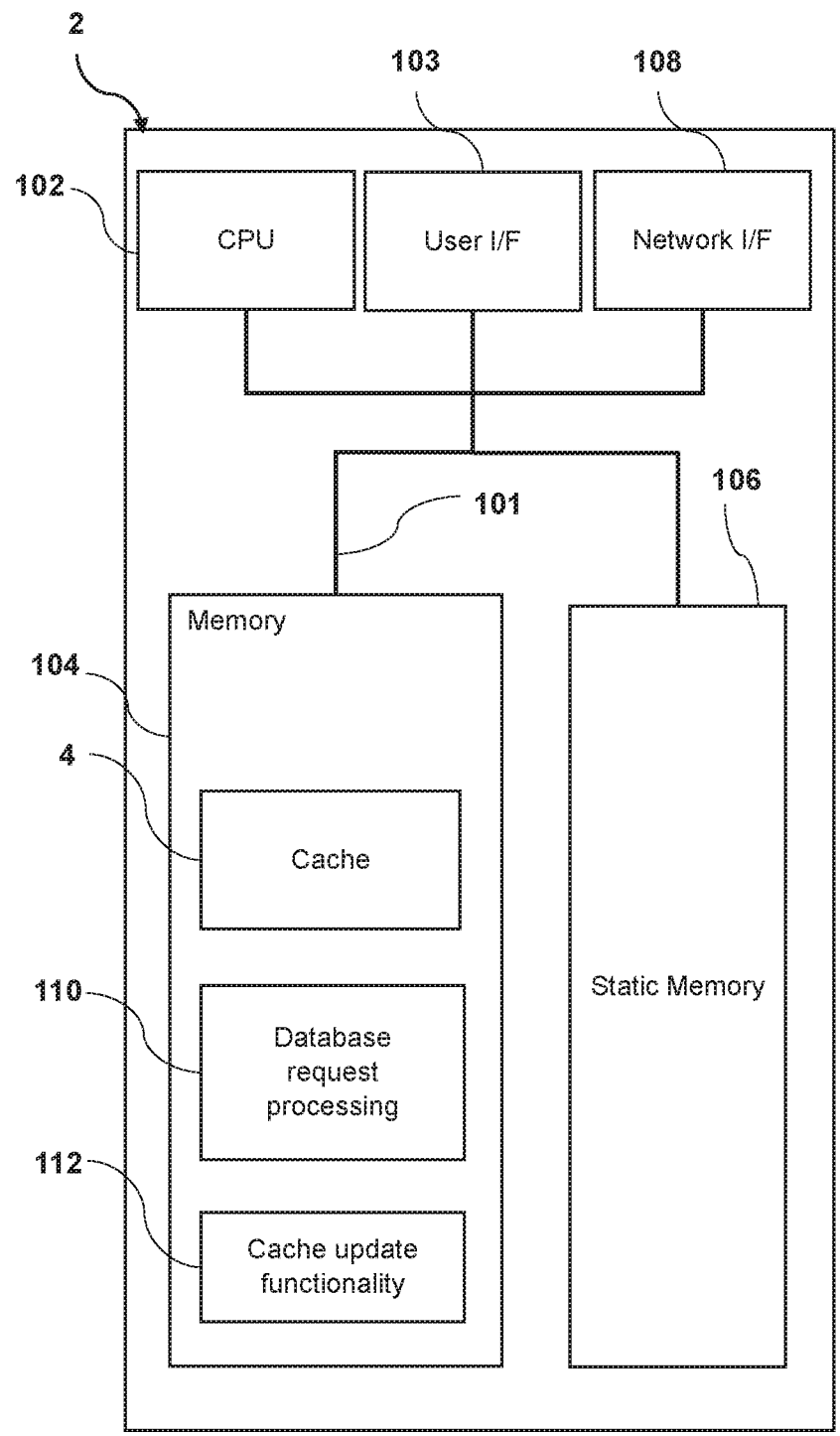
FIG. 10 is an exemplary schematic view of the internal architecture of the computing machine.

Finally, FIG. 10 is a diagrammatic representation of the internal component of a computing machine 2. The computing machine 2 includes a set of instructions to cause the computing machine 2 to perform any of the methodologies discussed herein when executed by the computing machine 2. The computing machine 2 includes at least one processor 102, a main memory 104 and a network interface device 108 which communicate with each other via a bus 101. Optionally, the computing machine 2 may further include a static memory 106 and a disk-drive unit. A video display, an alpha-numeric input device and a cursor control device may be provided as examples of user interface 103. The network interface device 108 connects the computing machine 2 at least to the clients 5 as well as to the primary database 3 and optionally also to the central node 9.

In embodiments in which the computing machine 2 also hosts the cache 4, the cache 4 may be kept in the main memory 104. A set of computer-executable instructions (i.e., computer program code) embodying any one, or all, of the methodologies described above, resides completely, or at least partially, in or on a machine-readable medium, e.g., the main memory 104 (shown as functional entities database request processing 110 including the functionality to receive and process database requests including determination operation 14 and cache update functionality 112 including the determining operations 17 and 19 as well as update operations 18 and 20) and/or the at least one processor 102 and/or in the static memory 106. The instructions may further be transmitted or received as a propagated signal via the Internet through the network interface device 108. Basic operation of the computing machine including user interface and network communication is controlled by an operating system which is also located in the main memory 104, the at least one processor 102 and/or the static memory 106.

In general, the routines executed to implement the embodiments of the invention, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

The invention claimed is:

1. A method for updating data in a cache performed by a computing machine which is coupled to a primary database maintaining original data and to the cache maintaining data corresponding to the original data in the primary database, the method comprising, at the computing machine:
    in response to receiving a first database query relating to a first data, determining, based on at least one given polling factor, whether to process the first database query by utilizing the cache or based on the primary database;
    in response to concluding processing the first database query, determining whether to update the first data in the cache; and
    based on the result of the determining, updating the first data in the cache based on original first data in the primary database.

2. The method of claim 1, wherein the first database query is a read query, the method comprising:
    processing the first database query utilizing the cache,
    wherein determining to update the first data in the cache is performed in response to concluding processing the first database query utilizing the cache.

3. The method of claim 1, wherein the first database query is a write query, the method comprising:
    processing the first database query based on the original first data in the primary database resulting in a change of the original first data in the primary database,
    wherein determining to update the first data in the cache based on the changed original first data in the primary database is performed in response to concluding processing the first database query based on the original first data in the primary database.

4. The method of claim 1, further comprising:
    in response to concluding processing the first database query, determining whether to update at least one second data in the cache correlated to the first data based on original second data in the primary database.

5. The method of claim 1, further comprising:
    determining, by employing a machine-learning algorithm, a decrease of a likelihood that the first data in the cache is still valid, wherein the first data in the cache is still valid when the first data in the cache is identical with the original first data in the primary database,
    determining, based at least on the decrease of the likelihood that the first data in the cache is still valid, whether to update the first data in the cache based on the original first data in the primary database.

6. The method of claim 5, further comprising:
    after having determined the decrease of the likelihood that the first data in the cache is still valid, determining whether to update at least one second data in the cache correlated to the first data based on original second data in the primary database.

7. The method of claim 1, wherein determining whether to update the first data in the cache comprises:
    in response to determining that at least one previous second database query relating to the first data was received within a first given time period, inhibiting updating the first data in the cache.

8. The method of claim 1, wherein the computing machine is a local node in a distributed database system with a plurality of local nodes and a central node, the method further comprising:
    sending a first update request to update at least the first data in the cache to the central node,
    in response to determining, at the central node, that at least one previous second update request to update the first data in the cache was received from another local node within a second given time period, inhibiting updating the first data in the cache.

9. The method of claim 1, wherein the at least one given polling factor comprises at least one of:
    a type of the first database query request,
    an existence of the first data in the cache,
    a polling error rate being a ratio between a number of access failures to the primary database and a number of access attempts to the primary database,
    a number of write accesses on the original first data in a given timeframe,
    an age of the first data in the cache,
    a validity rate indicating a probability for first data in the cache being valid at a certain age,
    an access frequency of the first data in the cache,
    an update resource being a measure of computation costs and/or network load required to update the first data in the cache.

10. A computing machine coupled to a primary database maintaining original data and to a cache maintaining data corresponding to the original data in the primary database, the computing machine comprising:
    a network interface device for connecting the computing machine to the primary database and the cache;
    a processor coupled to the network interface device, the processor configured to:
    in response to receiving a first database query relating to a first data, determine, based on at least one given polling factor, whether to process the first database query by utilizing the cache or based on the primary database;
    in response to concluding processing the first database query, determine whether to update the first data in the cache; and
    based on the result of the determining, update the first data in the cache based on original first data in the primary database.

11. The computing machine of claim 10, wherein the first database query is a read query; the processor further configured to process the first database query utilizing the cache;
    wherein the processor is configured to determine to update the first data in the cache in response to concluding processing the first database query utilizing the cache.

12. The computing machine of claim 10, wherein the first database query is a write query; the processor further configured to process the first database query based on the original first data in the primary database resulting in a change of the original first data in the primary database;
  wherein the processor is configured to determine to update the first data in the cache based on the changed original first data in the primary database is performed in response to concluding processing the first database query based on the original first data in the primary database.

13. The computing machine of claim 10, the processor further configured to:
  in response to concluding processing the first database query; determine whether to update at least one second data in the cache correlated to the first data based on original second data in the primary database.

14. The computing machine of claim 10, processor further configured to:
  determine, by employing a machine-learning algorithm, a decrease of a likelihood that the first data in the cache is still valid, wherein the first data in the cache is still valid when the first data in the cache is identical with the original first data in the primary database,
  determine, based at least on the decrease of the likelihood that the first data in the cache is still valid, whether to update the first data in the cache based on the original first data in the primary database.

15. The computing machine of claim 14, processor further configured to:
  after having determined the decrease of the likelihood that the first data in the cache is still valid, determine whether to update at least one second data in the cache correlated to the first data based on original second data in the primary database.

16. The computing machine of claim 10, processor further configured to determine whether to update the first data in the cache by:
  in response to determining that at least one previous second database query relating to the first data was received within a first given time period, inhibiting updating the first data in the cache.

17. The computing machine of claim 10, wherein the computing machine is a local node in a distributed database system with a plurality of local nodes and a central node; the processor further configured to:
  send a first update request to update at least the first data in the cache to the central node, for determination at the central node whether at least one previous second up-date request to update the first data in the cache was received from another local node within a second given time period, and for inhibition of updating the first data in the cache responsive to the determination at the central node.

18. The computing machine of claim 10, wherein the at east one given polling factor comprises at least one of:
  a type of the first database query request,
  an existence of the first data in the cache,
  a polling error rate being a ratio between a number of access failures to the primary database and a number of access attempts to the primary database,
  a number of write accesses on the original first data in a given timeframe,
  an age of the first data in the cache,
  a validity rate indicating a probability for first data in the cache being valid at a certain age,
  an access frequency of the first data in the cache,
  an update resource being a measure of computation costs and/or network load required to update the first data in the cache.

19. A computer program product comprising program code instructions stored on a non-transitory computer readable medium, wherein the instructions are executable on a computer to:
  in response to receiving a first database query relating to a first data, determine, based on at least one given polling factor, whether to process the first database query by utilizing a cache maintaining data corresponding to original data in a primary database, or based on the primary database maintaining the original data;
  in response to concluding processing the first database query, determine whether to update the first data in the cache; and
  based on the result of the determining, updating the first data in the cache based on original first data in the primary database.

* * * * *